(12) United States Patent
Zhang et al.

(10) Patent No.: US 12,019,796 B2
(45) Date of Patent: Jun. 25, 2024

(54) USER ATTENTION DETERMINATION FOR EXTENDED REALITY

(71) Applicant: QUALCOMM Incorporated, San Diego, CA (US)

(72) Inventors: Danlu Zhang, San Diego, CA (US); Paul Holdaway, Carlsbad, CA (US); Jiaying Pan, San Diego, CA (US); Ajinkya Shyam Ambre, San Diego, CA (US); Vinayak Muralidharan, San Diego, CA (US); Martin Renschler, San Diego, CA (US); Michael Mager, San Diego, CA (US); Brian Momeyer, Escondido, CA (US); Rashmi Kulkarni, Redwood City, CA (US); Damir Didjusto, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/816,228

(22) Filed: Jul. 29, 2022

(65) Prior Publication Data
US 2024/0036640 A1    Feb. 1, 2024

(51) Int. Cl.
*G06T 19/00*    (2011.01)
*G06F 3/01*    (2006.01)
*G06V 10/25*    (2022.01)

(52) U.S. Cl.
CPC .............. *G06F 3/013* (2013.01); *G06F 3/015* (2013.01); *G06T 19/006* (2013.01); *G06V 10/25* (2022.01)

(58) Field of Classification Search
CPC ......... G06F 3/013; G06F 3/015; G06V 10/25; G06T 19/006
See application file for complete search history.

(56) References Cited

U.S. PATENT DOCUMENTS

| | | | |
|---|---|---|---|
| 2014/0168056 A1* | 6/2014 | Swaminathan | G06V 30/142 345/156 |
| 2014/0347265 A1* | 11/2014 | Aimone | H04W 4/30 345/156 |
| 2017/0068119 A1* | 3/2017 | Antaki | G06F 3/012 |
| 2021/0035298 A1* | 2/2021 | Yildiz | A61B 5/168 |
| 2021/0357670 A1 | 11/2021 | Wu et al. | |
| 2022/0121867 A1 | 4/2022 | Arar et al. | |

FOREIGN PATENT DOCUMENTS

| | | |
|---|---|---|
| CN | 110464365 A | 11/2019 |
| CN | 110623629 B | 5/2022 |

OTHER PUBLICATIONS

International Search Report and Written Opinion—PCT/US2023/069987—ISA/EPO—Oct. 30, 2023.

* cited by examiner

*Primary Examiner* — Antonio A Caschera
(74) *Attorney, Agent, or Firm* — Polsinelli

(57) ABSTRACT

Attention evaluation by an extended reality system, the system determining one or more regions of interest (ROI) for an image displayed to a user. The system may also receive eye tracking information indicating an area of the image that the user is looking at. The system may further generate focus statistics based on the area of the image at which the user is looking at and the one or more ROI; and output the generated focus statistics.

27 Claims, 7 Drawing Sheets

USER ATTENTION DETERMINATION FOR EXTENDED REALITY

FIELD

The present disclosure generally relates to determining attention of users in extended reality systems. In some examples, aspects of the present disclosure are related to using eye tracking in comparison to regions of interest (ROI) of an extended reality system to determine an attention or level of interest of a user of the extended reality system.

BACKGROUND

Extended reality technologies can be used to present virtual content to users, and/or can combine real environments from the physical world and virtual environments to provide users with XR experiences. The term XR can encompass VR, AR, mixed reality, and the like. Extended reality systems can allow users to experience XR environments by overlaying virtual content onto images of a real world environment, which can be viewed by a user through an XR device (e.g., a head-mounted display, extended reality glasses, or other device). An extended reality (XR) device is a device that displays an environment to a user, for example through a head-mounted display (HMD) or other device. The environment is at least partially different from the real-world environment in which the user is in. The user can generally change their view of the environment interactively, for example by tilting or moving the HMD or other device.

In some cases, an XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. "See-through" or "pass-through" XR systems can be worn by users while the users are engaged in activities in their real-world environment.

In some cases, the XR system can include an eye imaging (also referred to herein as gaze detection or eye tracking) system. In some cases, eyes of the user of an XR system can move over a large range of offset and/or rotation. In some cases, the eyes of a user of an XR system can have different alignment relative to the display.

While the goal of many XR systems is to create realistic, interactive, and fully immersive XR environments, XR systems should also ensure that virtual content does not create potentially dangerous situations for users, or otherwise prevent users from properly interacting with the real world environment. Improved XR systems are needed to dynamically adapt virtual content based on features of the real world environment.

SUMMARY

Systems and techniques are described herein for attention evaluation of a user. In one illustrative example, a method for attention evaluation is provided. The method includes: determining a region of interest (ROI) for an image displayed to a user; receiving eye tracking information indicating an area of the image at which the user is gazing; generating focus statistics based on an area of the image at which the user is gazing and the ROI; and outputting the generated focus statistics.

In another example, an apparatus is provided for attention evaluation, the apparatus including at least one memory comprising instructions; and at least one processor coupled to the at least one memory and configured to: determine a region of interest (ROI) for an image displayed to a user; receive eye tracking information indicating an area of the image at which the user is gazing; generate focus statistics based on an area of the image at which the user is gazing and the ROI; and output the generated one or more focus statistics.

In another example, a non-transitory computer-readable medium is provided having stored thereon instructions that, when executed by at least one processor, cause the at least one processor to: determine a region of interest (ROI) for an image displayed to a user; receive eye tracking information indicating an area of the image at which the user is gazing; generate focus statistics based on an area of the image at which the user is gazing and the ROI; and output the generated one or more focus statistics.

In another example, an apparatus for attention evaluation is provided, the apparatus including: means for determining a region of interest (ROI) for an image displayed to a user; means for receiving eye tracking information indicating an area of the image at which the user is gazing; means for generating focus statistics based on an area of the image at which the user is gazing and the ROI; and means for outputting the generated focus statistics.

In some aspects, the apparatus can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
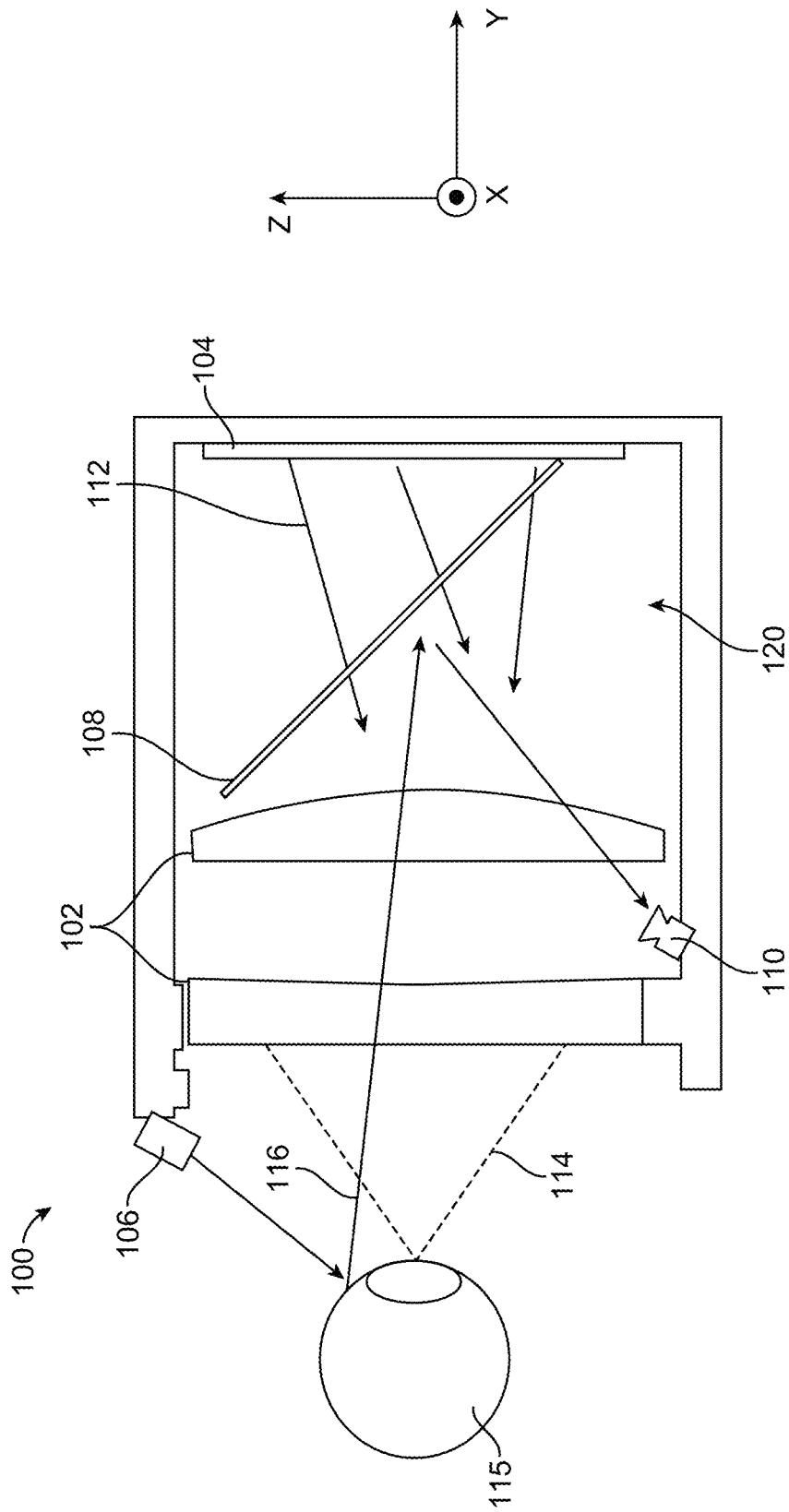
FIG. 1 is a block diagram illustrating a simplified cross-sectional view of lens assembly of an extended reality system, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

An XR system can include one or more user-facing sensors that face the user, such as user-facing image sensors (or cameras) that face the user. For instance, the user-facing sensors can face the user's face, eyes, one or more other portions of the user's body, and/or a combination thereof.

In some cases, the immersive nature of XR devices or systems may overstimulate, tire, fatigue, distract, or even bore a user. For example, a user may be focused on interacting with an XR environment in such a way that the user is unaware that they are becoming fatigued or losing concentration on the virtual content. While the goal of many XR systems is to create realistic, interactive, and fully immersive XR environments, XR systems should also help prevent virtual content from exhausting or otherwise affecting the user.

The present disclosure describes systems, apparatuses, methods, and computer-readable media (collectively referred to as "systems and techniques") for determining when a user of an XR device or system is losing interest in XR content, is tired or fatigued, etc. by tracking a gaze of the user in the XR environment. For example, the eyes of a user tend to move to focus on areas that are of interest to the user. By comparing areas (e.g., in an image) of the XR environment for which the eyes of the user are focused to areas of the XR environment that are determined to be of potential interest to the user (e.g., the ROIs), the XR device or system can determine an extent of the user's attention with respect to the XR environment. These areas of interest in the XR environment may be determined in a variety of ways. For example, where the XR environment adds objects to a virtual background or adds virtual objects to a physical environment, these objects may be considered areas of interest. As another example, when a content creator of the XR environment is creating content, the content creator may be able to designate areas or portions of the content as areas of interest in the XR environment. As another example, areas of relatively high movement or areas related to (e.g., at the center of) converging lines depicted in an image may be designated as areas of interest in the XR environment.

In some cases, how much attention the user is paying to the areas of interest of the XR environment is measured to infer a level of interest of the user in the XR environment. The level of interest of the user in the XR environment may be monitored over time to determine information related to user attentiveness. As an example, the XR device or system can determine that the user's attention is directed away from the areas of interest in the XR environment for more than a threshold amount of time and thus that the user is losing interest in the content of the XR environment.

In some cases, the XR environment may be modified, for example by adding, removing, varying, etc. the content in the XR environment, such as to help regain interest in the content of the XR environment. As another example, if the XR device or system determines that the user was previously interested in the XR environment and, over time, the user's attention is more frequently directed away from the areas of interest in the XR environment and/or is directed away from the areas of interest for longer periods of time, then the XR device or system may infer that the user is becoming fatigued. In response to such a determination of user fatigue, the XR device or system may display a notification, alert, or warning to the user (e.g., suggesting that the user take a break or rest).

In some cases, the eye tracking data may be used to detect and/or compensate for possible visual conditions or issues. For example, the XR device or system may determine that the user's eyes are consistently directed to two different areas of the XR environment, and in response may display a notification, alert, or warning of the possible visual condition or issue. In some cases, such as in response to an indication from the user or automatically based on a determination that the user's eyes are consistently directed at two different areas, the XR device or system may determine which eye is more consistently directed at areas of interest and monitor the area for which that eye is focused for determining where the user's attention is directed. As another example, if the XR device or system determines that the user's eyes become directed at two different areas of the XR environment after a period of time when the user's eyes are substantially directed at the same area of the XR environment, the XR device or system may infer that the user is becoming fatigued and respond accordingly.

Various aspects of the techniques described herein will be discussed below with respect to the figures. FIG. 1 is a diagram illustrating a simplified cross-sectional view of lens assembly 100 (e.g., of an HMD). In the illustrated example of FIG. 1, the lens assembly 100 includes a lens system 102, a display 104, an illumination source 106, a light directing component 108, and an image sensor 110.

As illustrated, light from the display 104 can pass through the light directing component 108 and be focused by the lens system 102 on the user's eye 115. In some implementations, the light directing component 108 can be configured to allow visible light from the display 104 to pass through. In the illustrated example of FIG. 1, the light directing component 108 is positioned within a cavity 120 of the lens assembly 100 between the lens system 102 and the display 104. As illustrated in FIG. 1, the visible light 112 can be focused at the position of the user's eye 115 as illustrated by the lines 114. In some cases, the light directing component 108 can be configured to reflect other wavelengths of light, such as IR light. In some examples, the light directing component 108 can be implemented using a reflective coating. In some implementations, the light directing component 108 can include a dielectric material that passes visible light and reflects IR light. In some examples, the light directing component can be coated with a transparent conductor. In one illustrative example, an indium-tin-oxide (ITO) material that is transparent to visible light and reflects IR light can be used to coat the light directing component 108. The illumination source 106 can be an IR illumination source (e.g., an IR LED) that illuminates the user's eye 115. When the IR light reaches the user's eye, a scattered and/or reflected portion of the light, such as the example ray 116 can reach the light directing component 108 and reflect toward the image sensor 110.

The image sensor 110 can be an infrared (IR) image sensor that can detect the scattered and/or reflected light from the eye to form one or more images. In some cases, an XR system can obtain image data from the image sensor 110 and track the user's eye position and/or gaze direction based on the obtained data.

In some cases, the position of a user's eyes relative to the lens assembly 100 can vary. For example, each individual user may have different eyes size, face shape, face symmetry, eye separation, facial feature alignment, and/or a combination thereof. In some implementations, an eye tracking system can be configured to perform eye tracking over a specified range of eye positions and/or rotations using the image data collected, for example, from the image sensor 110. In some cases, if the user's eye moves outside of the specific range, the XR system may be unable to perform eye tracking until the eye returns to a position and/or rotation within the specific range. For example, if the user's eye 115 shown in FIG. 1 rotates to look down (e.g., toward the negative z-axis direction), the image of the user's eye 115 may be obstructed by eyelashes and/or by the curvature of the user's eye 115. In some cases, the range of eye tracking may be limited by the desire to keep the lens assembly of an XR system compact.

In some cases, the systems and techniques described herein can be used to obtain eye tracking data across the complete range of motion (e.g., translation and/or rotation) of a user's eye. In some cases, the systems and techniques described herein can be used to obtain eye tracking data over a wider range of eye position and/or rotation achievable by a single eye tracking system. By utilizing two or more eye trackers with light directing components (e.g., light directing component 108 of FIG. 1) oriented along different axes (e.g., vertical and horizontal), the overall field of view of eye tracking systems can be extended to include the combined eye tracking field of view of all of the two or more sensors. In some cases, each eye tracking system may have a wider field of view for motion and/or rotation along a first axis (e.g., the axis of orientation of the light directing component) and a narrower field of view along a second axis, perpendicular to the first axis. In some cases, the distance of the displayed image (e.g., a projected virtual image) from a display can be far enough away from a user's eyes that the user's eyes will move together when looking at the display. In some cases, an eye tracker oriented in the first direction can track position and/or rotation of a first eye of a user, and an eye tracker oriented in the second direction can track position and/or rotation of a second eye of a user. In some implementations, the overall range for eye tracking from can be increased using eye tracking on the data from both eye trackers. For example, one eye tracker can be used to track vertical movement and/or rotation of the first eye, and another eye tracker can be used to track horizontal movement and/or rotation of the second eye. Because the eyes move together, as long as one of the eyes is within range of either of the eye trackers, the position of both of the user's eyes can be determined.

While examples are described herein for eye tracking in XR systems, the eye tracking systems and techniques described herein can be used for eye tracking with other types of devices and with other geometries. Of note, the illustration in FIG. 1 is not to scale and is provided only for the purposes of illustration. In addition, more or fewer components can be included in the lens assembly 100 of FIG. 1 without departing from the scope of the present disclosure.

Figure 2:
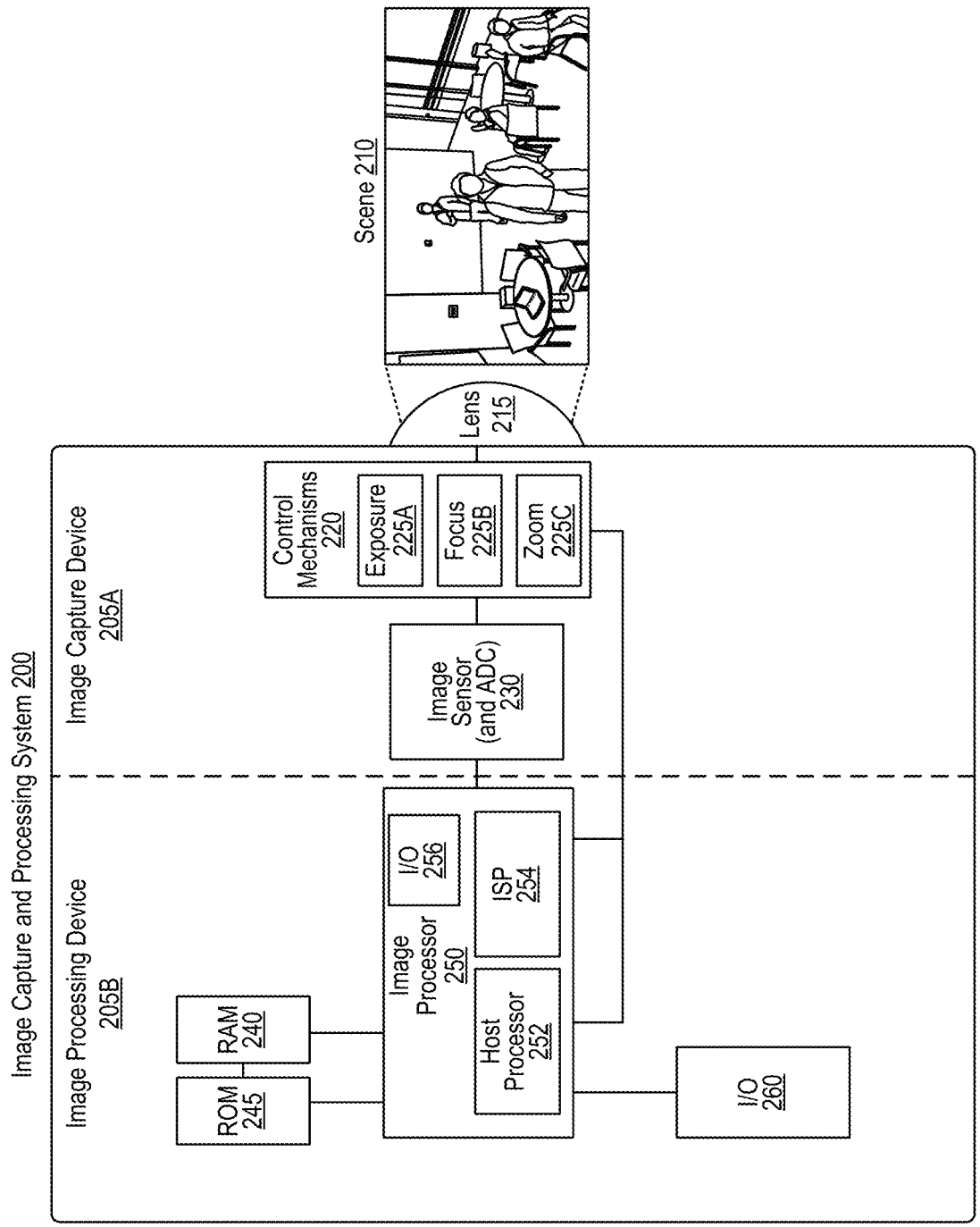
FIG. 2 is a block diagram illustrating an architecture of an image capture and processing system, in accordance with some examples.

FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. In some cases, the lens 215 and image sensor 230 can be associated with an optical axis. In one illustrative example, the photosensitive area of the image sensor 230 (e.g., the photodiodes) and the lens 215 can both be centered on the optical axis. A lens 215 of the image capture and processing system 200 faces a scene 210 and receives light from the scene 210. The lens 215 bends incoming light from the scene toward the image sensor 230. The light received by the lens 215 passes through an aperture. In some cases, the aperture (e.g., the aperture size) is controlled by one or more control mechanisms 220 and is received by an image sensor 230. In some cases, the aperture can have a fixed size.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting. In some cases, the lens 215 can be fixed relative to the image sensor and focus control mechanism 225B can be omitted without departing from the scope of the present disclosure.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses. In some cases, zoom control mechanism 225C can control the zoom by capturing an image from an image sensor of a plurality of image sensors (e.g., including image sensor 230) with a zoom corresponding to the zoom setting. For example, image capture and processing system 200 can include a wide angle image sensor with a relatively low zoom and a telephoto image sensor with a greater zoom. In some cases, based on the selected zoom setting, the zoom control mechanism 225C can capture images from a corresponding sensor.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 2, other types of color filters may use yellow, magenta, and/or cyan (also referred to as "emerald") color filters instead of or in addition to red, blue, and/or green color filters. In some cases, some photodiodes may be configured to measure IR light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 230) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 230 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 7:
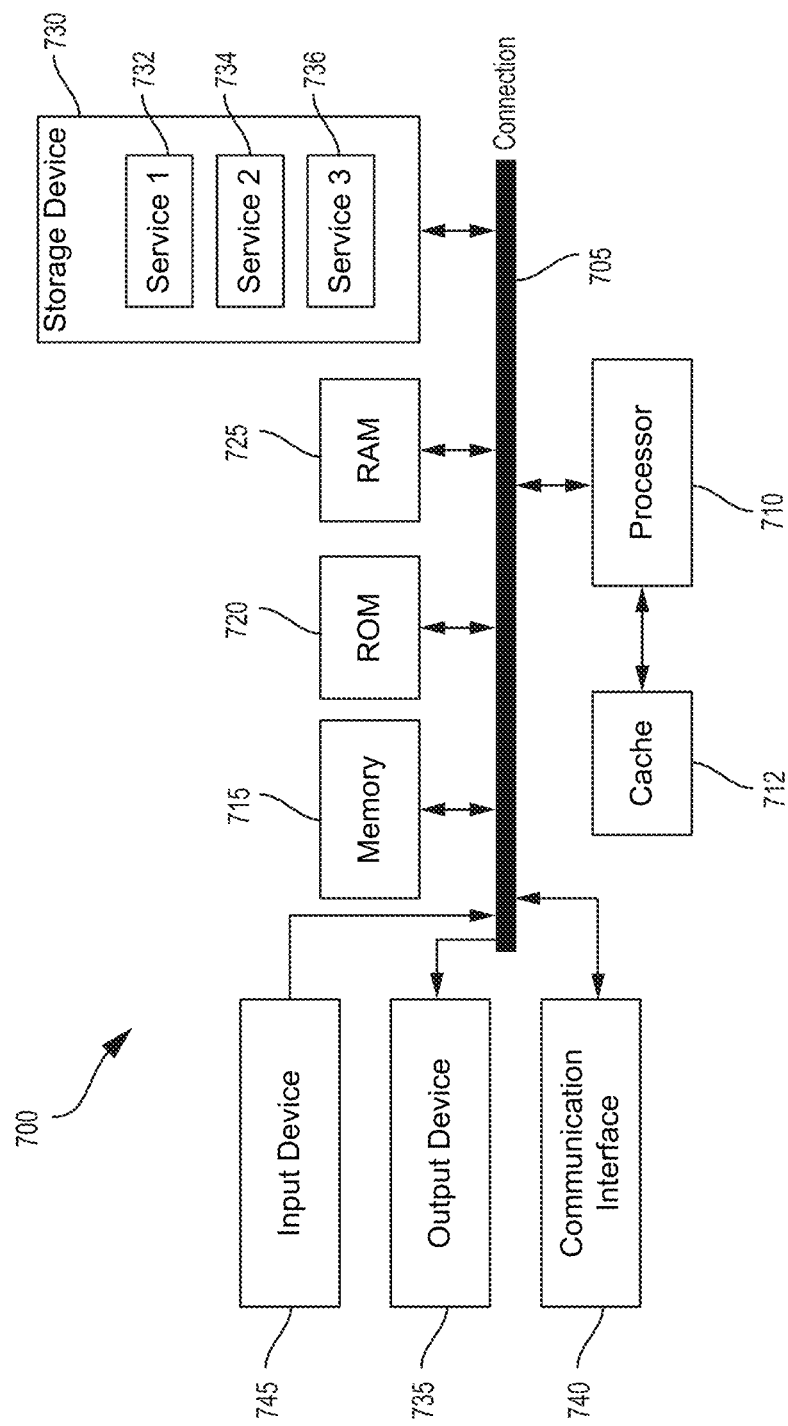
FIG. 7 is a diagram illustrating an example of a system for implementing certain aspects described herein.

The image processor 250 may include one or more processors, such as one or more image signal processors (ISPs) (including ISP 254), one or more host processors (including host processor 252), and/or one or more of any other type of processor 710 discussed with respect to the computing system 700 of FIG. 7. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240/725, read-only memory (ROM) 245/720, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 735, any other input devices 745, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

In some examples, the extended reality (XR) system 300 of FIG. 3 (described below) can include the image capture and processing system 200, the image capture device 205A, the image processing device 205B, or a combination thereof.

Figure 3:
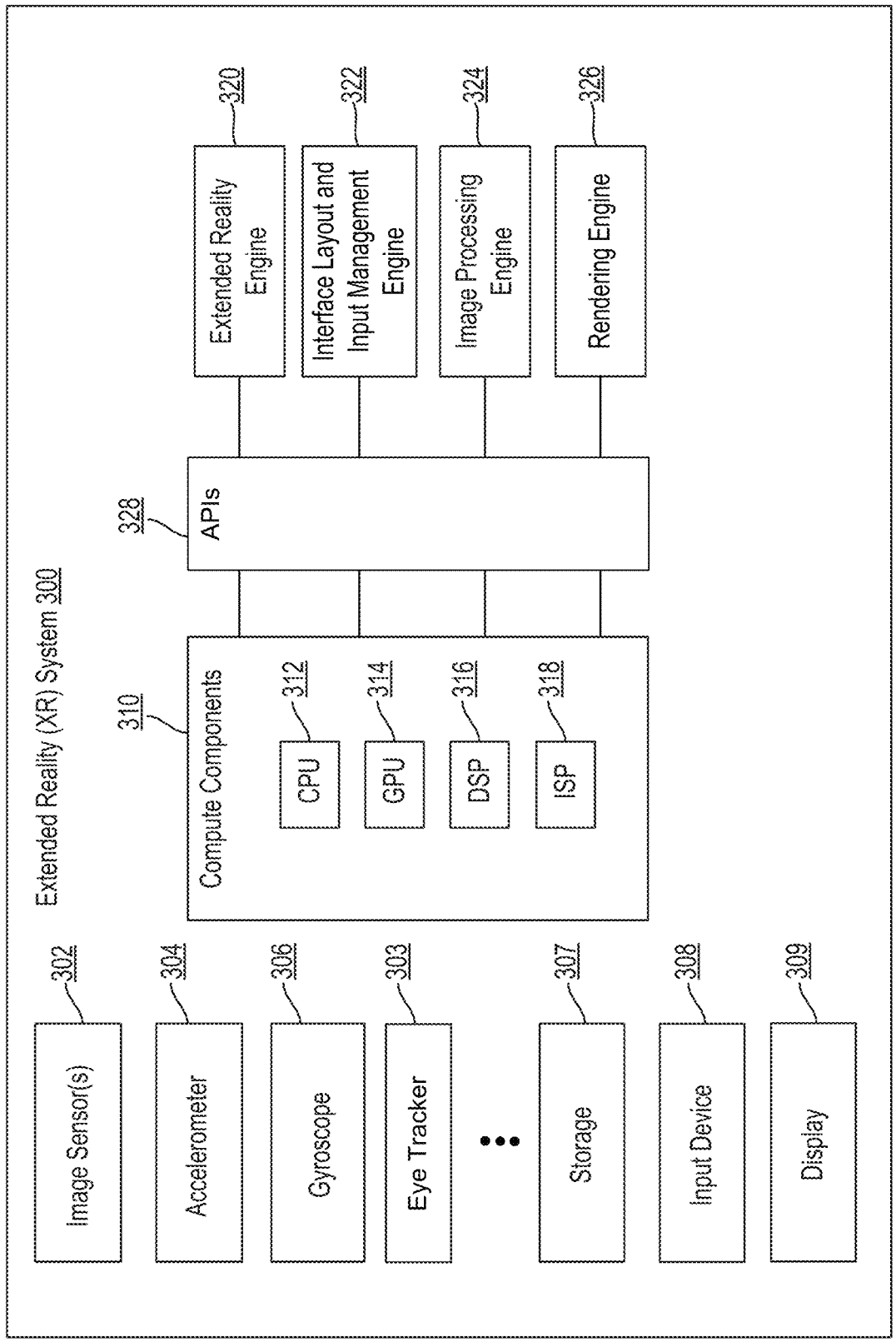
FIG. 3 is a diagram illustrating an architecture of an example extended reality (XR) system, in accordance with some examples.

FIG. 3 is a diagram illustrating an architecture of an example extended reality (XR) system 300, in accordance with some aspects of the disclosure. The XR system 300 can run (or execute) XR applications and implement XR operations. In some examples, the XR system 300 can perform tracking and localization, mapping of an environment in the physical world (e.g., a scene), and/or positioning and rendering of virtual content on a display 309 (e.g., a screen, visible plane/region, and/or other display) as part of an XR experience. For example, the XR system 300 can generate a map (e.g., a three-dimensional (3D) map) of an environment in the physical world, track a pose (e.g., location and position) of the XR system 300 relative to the environment (e.g., relative to the 3D map of the environment), position and/or anchor virtual content in a specific location(s) on the map of the environment, and render the virtual content on the display 309 such that the virtual content appears to be at a location in the environment corresponding to the specific location on the map of the scene where the virtual content is positioned and/or anchored. The display 309 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 300 includes one or more image sensors 302, an accelerometer 304, one or more eye trackers 303, a gyroscope 306, storage 307, compute components 310, an XR engine 320, an interface layout and input management engine 322, an image processing engine 324, and a rendering engine 326. In the example shown in FIG. 3, the engines 320-326 may access hardware components, such as components 302-318, or another engine 320-326 via one or more application programing interfaces (APIs) 328. Generally, APIs 328 are a set of functions, services, interfaces, which act as a connection between computer components, computers, or computer programs. The APIs 328 may provide a set of API calls which may be accessed by applications which allow information to be exchanged, hardware to be accessed, or other actions to be performed.

It should be noted that the components 302-328 shown in FIG. 3 are non-limiting examples provided for illustrative and explanation purposes, and other examples can include more, less, or different components than those shown in FIG. 3. For example, in some cases, the XR system 300 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 3. While various components of the XR system 300, such as the accelerometer 304, may be referenced in the singular form herein, it should be understood that the XR system 300 may include multiple of any component discussed herein (e.g., multiple accelerometers 304).

The XR system 300 includes or is in communication with (wired or wirelessly) an input device 308. The input device 308 can include any suitable input device, such as a touchscreen, a pen or other pointer device, a keyboard, a mouse button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, one or more image sensors 302 can capture images that can be processed for interpreting gesture commands.

In some implementations, the one or more image sensors 302, the accelerometer 304, the gyroscope 306, storage 307, eye tracker 303, compute components 310, XR engine 320, interface layout and input management engine 322, image processing engine 324, and rendering engine 326 can be part of the same computing device. For example, in some cases, the one or more image sensors 302, eye trackers 303, the accelerometer 304, the gyroscope 306, storage 307, compute components 310, APIs 328, XR engine 320, interface layout and input management engine 322, image processing engine 324, and rendering engine 326 can be integrated into an HMD, extended reality glasses, smartphone, laptop, tablet computer, gaming system, and/or any other computing device. However, in some implementations, the one or more image sensors 302, eye trackers 303, the accelerometer 304, the gyroscope 306, storage 307, compute components 310, APIs 328, XR engine 320, interface layout and input management engine 322, image processing engine 324, and rendering engine 326 can be part of two or more separate computing devices. For example, in some cases, some of the components 302-226 can be part of, or implemented by, one computing device and the remaining components can be part of, or implemented by, one or more other computing devices.

The storage 307 can be any storage device(s) for storing data. Moreover, the storage 307 can store data from any of the components of the XR system 300. For example, the storage 307 can store data from the one or more image sensors 302 (e.g., image or video data), data from the eye trackers 303 (e.g., eye tracking data) data from the accelerometer 304 (e.g., measurements), data from the gyroscope 306 (e.g., measurements), data from the compute components 310 (e.g., processing parameters, preferences, virtual content, rendering content, scene maps, tracking and localization data, object detection data, privacy data, XR application data, face recognition data, occlusion data, etc.), data from the XR engine 320, data from the interface layout and input management engine 322, data from the image processing engine 324, and/or data from the rendering engine 326 (e.g., output frames). In some examples, the storage 307 can include a buffer for storing frames for processing by the compute components 310.

The one or more compute components 310 can include a central processing unit (CPU) 312, a graphics processing unit (GPU) 314, a digital signal processor (DSP) 316, an image signal processor (ISP) 318, and/or other processor (e.g., a neural processing unit (NPU) implementing one or more trained neural networks). The compute components 310 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 310 can implement (e.g., control, operate, etc.) the XR engine 320, the interface layout and input management engine 322, the image processing engine 324, and the rendering engine 326. In other examples, the compute components 310 can also implement one or more other processing engines.

The one or more image sensors 302 can include any image and/or video sensors or capturing devices. The one or more image sensors 302 can include one or more user-facing image sensors. In some cases, user-facing images sensors can be included in the one or more image sensors 302. In some examples, user-facing image sensors can be used for face tracking, eye tracking, body tracking, and/or any combination thereof. The one or more image sensors 302 can include one or more environment facing sensors. In some cases, the environment facing sensors can face in a similar direction as the gaze direction of a user. In some examples, the one or more image sensors 302 can be part of a multiple-camera assembly, such as a dual-camera assembly. The one or more image sensors 302 can capture image and/or video content (e.g., raw image and/or video data), which can then be processed by the compute components 310, the XR engine 320, the interface layout and input management engine 322, the image processing engine 324, and/or the rendering engine 326 as described herein. In some examples, the image sensors 302 may include an image capture and processing system 200, an image capture device 205A, an image processing device 205B, or a combination thereof.

In some examples, one or more image sensors 302 can capture image data and can generate images (also referred to as frames) based on the image data and/or can provide the image data or frames to the XR engine 320, the interface layout and input management engine 322, the image processing engine 324, and/or the rendering engine 326 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, one or more image sensors 302 (and/or other camera of the XR system 300) can be configured to also capture depth information. For example, in some implementations, one or more image sensors 302 (and/or other camera) can include an RGB-depth (RGB-D) camera. In some cases, the XR system 300 can include one or more depth sensors (not shown) that are separate from one or more image sensors 302 (and/or other camera) and that can capture depth information. For instance, such a depth sensor can obtain depth information independently from one or more image sensors 302. In some examples, a depth sensor can be physically installed in the same general location as one or more image sensors 302 but may operate at a different frequency or frame rate from one or more image sensors 302. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 300 can also include other sensors in its one or more sensors. The one or more sensors can include one or more accelerometers (e.g., accelerometer 304), one or more gyroscopes (e.g., gyroscope 306), and/or other sensors. The one or more sensors can provide velocity, orientation, and/or other position-related information to the compute components 310. For example, the accelerometer 304 can detect acceleration by the XR system 300 and can generate acceleration measurements based on the detected acceleration. In some cases, the accelerometer 304 can provide one or more translational vectors (e.g., up/down, left/right, forward/back) that can be used for determining a position or pose of the XR system 300. The gyroscope 306 can detect and measure the orientation and angular velocity of the XR system 300. For example, the gyroscope 306 can be used to measure the pitch, roll, and yaw of the XR system 300. In some cases, the gyroscope 306 can provide one or more rotational vectors (e.g., pitch, yaw, roll). In some examples, the one or more image sensors 302 and/or the XR engine 320 can use measurements obtained by the accelerometer 304 (e.g., one or more translational vectors) and/or the gyroscope 306 (e.g., one or more rotational vectors) to calculate the pose of the XR system 300. The XR system 300 can also include the eye tracker 303 for tracking movement of the eyes of a user of the XR system 300. The eye tracker 303 of the XR system 300 may operate in a manner similar to eye tracking as described with respect to FIG. 1.

The output of one or more sensors (e.g., the accelerometer 304, the gyroscope 306, one or more IMUs, and/or other sensors) can be used by the XR engine 320 to determine a pose of the XR system 300 (also referred to as the head pose) and/or the pose of one or more image sensors 302 (or other camera of the XR system 300). In some cases, the pose of the XR system 300 and the pose of one or more image sensors 302 (or other camera) can be the same. The pose of image sensor 302 refers to the position and orientation of one or more image sensors 302 relative to a frame of reference (e.g., with respect to an object). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from one or more image sensors 302 to track a pose (e.g., a 6DoF pose) of the XR system 300. For example, the device tracker can fuse visual data (e.g., using a visual tracking solution) from the image data with inertial data from the measurements to determine a position and motion of the XR system 300 relative to the physical world (e.g., the scene) and a map of the physical world. As described below, in some examples, when tracking the pose of the XR system 300, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 300 within the scene and the 3D map of the scene, etc. The 3D map can provide a digital representation of a scene in the real/physical world. In some examples, the 3D map can anchor location-based objects and/or content to real-world coordinates and/or objects. The XR system 300 can use a mapped scene (e.g., a scene in the physical world represented by, and/or associated with, a 3D map) to merge the physical and virtual worlds and/or merge virtual content or objects with the physical environment.

In some aspects, the pose of image sensor 302 and/or the XR system 300 as a whole can be determined and/or tracked by the compute components 310 using a visual tracking solution based on images captured by one or more image sensors 302 (and/or other camera of the XR system 300). For instance, in some examples, the compute components 310 can perform tracking using computer vision-based tracking, model-based tracking, and/or simultaneous localization and mapping (SLAM) techniques. For instance, the compute components 310 can perform SLAM or can be in communication (wired or wireless) with a SLAM system (not shown). SLAM refers to a class of techniques where a map of an environment (e.g., a map of an environment being modeled by XR system 300) is created while simultaneously tracking the pose of a camera (e.g., image sensor 302) and/or the XR system 300 relative to that map. The map can be referred to as a SLAM map and can be three-dimensional (3D). The SLAM techniques can be performed using color or grayscale image data captured by one or more image sensors 302 (and/or other camera of the XR system 300), and can be used to generate estimates of 6DoF pose measurements of one or more image sensors 302 and/or the XR system 300. Such a SLAM technique configured to perform 6DoF tracking can be referred to as 6DoF SLAM. In some cases, the output of the one or more sensors (e.g., the accelerometer 304, the gyroscope 306, one or more IMUs, and/or other sensors) can be used to estimate, correct, and/or otherwise adjust the estimated pose.

In some cases, the 6DoF SLAM (e.g., 6DoF tracking) can associate features observed from certain input images from one or more image sensors 302 (and/or other camera) to the SLAM map. For example, 6DoF SLAM can use feature point associations from an input image to determine the pose (position and orientation) of one or more image sensors 302 and/or XR system 300 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of one or more image sensors 302 and/or the XR system 300 can be determined by projecting features from the 3D SLAM map into an image or video frame and updating the camera pose from verified 2D-3D correspondences.

In one illustrative example, the compute components 310 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 300 can also track the hand and/or fingers of the user to allow the user to interact with and/or control virtual content in a virtual environment. For example, the XR system 300 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

As noted above, in some cases, the one or more sensors can include at least one IMU. An IMU is an electronic device that measures the specific force, angular rate, and/or the orientation of the XR system 300, using a combination of one or more accelerometers, one or more gyroscopes, and/or one or more magnetometers. In some examples, the one or more sensors can output measured information associated with the capture of an image captured by one or more image sensors 302 (and/or other camera of the XR system 300) and/or depth information obtained using one or more depth sensors of the XR system 300.

The image sensors 302 of XR system 300 can include a gaze and/or eye tracking sensor 330, such as the example discussed in FIG. 1. In some examples, the gaze and/or eye tracking sensor 330 can obtain images of one or both of a user's eyes from user-facing image sensors of the one or more image sensors 302. As previously noted, in other examples, the XR system 300 can also include other sensors, such as an inertial measurement unit (IMU), a magnetometer a machine vision sensor, a smart scene sensor, a speech recognition sensor, an impact sensor, a shock sensor, a position sensor, a tilt sensor, etc.

As described previously, XR devices and/or systems can facilitate interactions between users and content in the XR environment. It may be useful to have techniques to determine when a user is not interested in or is distracted from the XR environment. Generally, eye tracking can provide information regarding user attentiveness as the human eye has a relatively small area, or fovea, that has the highest visual acuity. Outside of a foveal area, visual acuity rapidly drops off. In some cases, foveated rendering may allow fovea areas of an image to be rendered with higher resolution than areas outside of the fovea areas (referred to as peripheral areas) that may be rendered with a lower resolution. In some cases, due to the higher resolution fovea areas and lower resolution peripheral areas, the eyes of a user may tend to move to focus the higher resolution foveal area towards environmental elements that are of interest. This eye movement may be due to either a conscious or unconscious decision of the user to look at the environmental elements. An amount of time and/or a number of times a user looks at an environmental element may indicate how much attention the user is paying to that environmental element. In accordance with aspects of the present disclosure, eye tracking data indicating which area(s) of an image at which a user is gazing may be compared to regions of interest (ROI) in the XR environment, or identified by the XR system, to determine information about user attentiveness to the XR environment.

Figure 4:
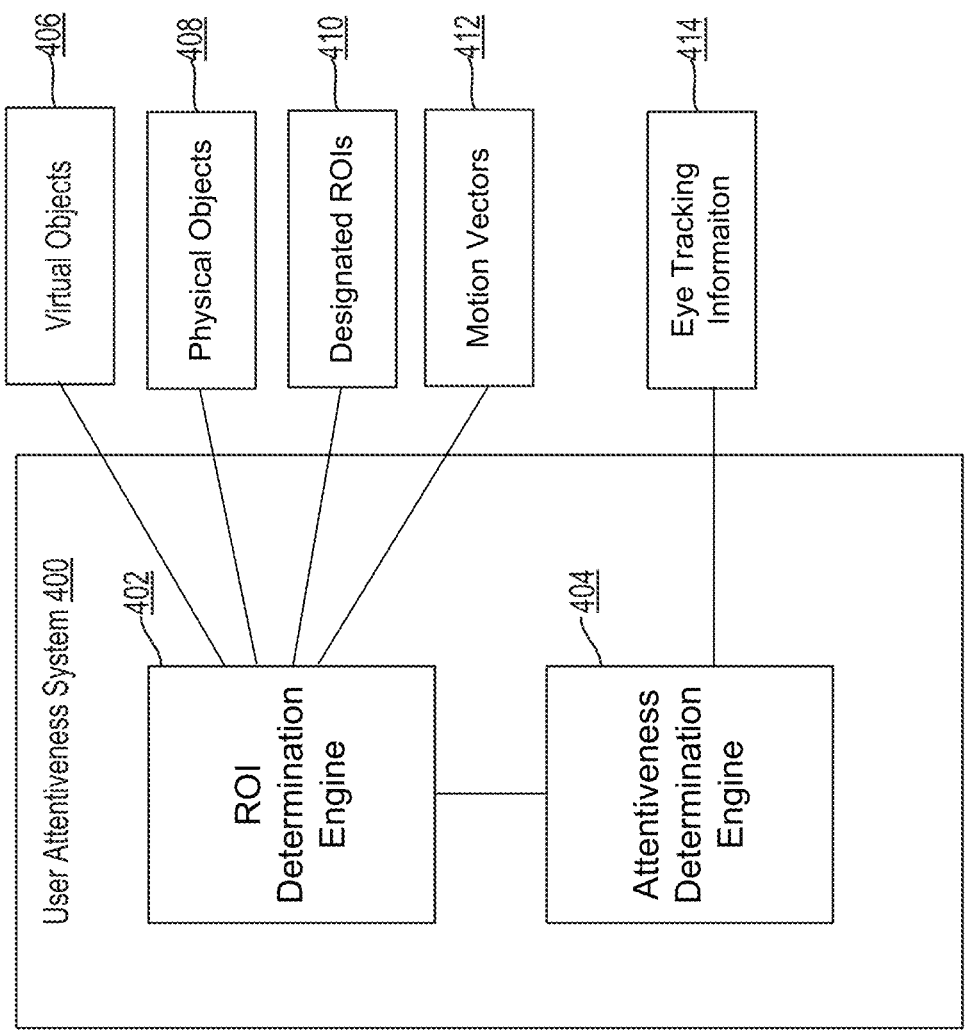
FIG. 4 is a block diagram illustrating an architecture of a user attentiveness system, in accordance with some examples.

FIG. 4 is a block diagram illustrating an architecture of a user attentiveness system 400, in accordance with aspects of the present disclosure. In some cases, the user attentiveness system 400 may be included in an XR system, such as XR system 300. For example, the user attentiveness system 400 may be incorporated in the interface layout and input management engine 322. The user attentiveness system 400 may determine a level of user attentiveness to content (e.g., XR or virtual content) displayed to a user (e.g., a user of the XR system 300). In this example, the user attentiveness system 400 includes an ROI determination engine 402 and an attentiveness determination engine 404.

The ROI determination engine 402 is configured to determine one or more ROIs in the content presented to the user (e.g., one or more images displayed on a display for viewing by the user). As described herein, ROIs determined by the ROI determination engine 402 in content are portions of the content or environment visible to a user (e.g., in a see-through or pass-through XR system) which are identified as likely to be of interest to the user. The ROI determination engine 402 may identify ROIs in a number of ways. As a first example, virtual objects 406 or content which are superimposed/merged into a view of the environment (e.g., by displaying the virtual objects 406 with the view of the environment), either physical or virtual, may be identified as ROIs. Virtual objects 406 may be obtained, for example, from the rendering engine 326 or XR engine 320 of FIG. 3 via API calls. In some cases, physical objects 408 in the physical environment (e.g., physical objects that are near to or between a user and one or more virtual objects/content) may also be identified as ROIs. For example, the physical objects 408 may prevent or alter the way users properly or safely interact with the one or more virtual objects/content. Physical objects 408 may be detected in the physical environment as a part of, for example, merging and/or overlaying the XR environment with the physical environment. The ROI determination engine 402 may obtain these detected physical objects 408 from, for example, the XR engine 320 of FIG. 3 via API calls.

As another example, designated ROIs 410 may be identified by a creator of the content (referred to as a content creator). The designated ROIs 410 may be made available during execution time. For example, APIs for interfacing with graphic accelerators, such as GPUs, or for rendering may include one or more function calls that allow a particular object, pixels, area, etc., to be designated as a ROI. A content creator such as a game developer may then be able to designate, for example, a certain portion or multiple portions of a game object, such as important puzzle pieces, as an ROI during development of the game. The designated ROI may be accessed, for example, via an API call.

Generally, rendering images for display to a user rapidly becomes more computationally expensive as resolutions increase. One possible way to reduce the computational load on the system while still maintaining perceived resolution is to reduce the rendering resolution for portions of the image that the user is less likely to look at, while maintaining, or reducing the resolution to a lesser extent that for those areas the user is less likely to look at, the rendering resolutions for areas that the user is more likely to look at (i.e., the ROIs). By rendering the ROIs in a higher resolution than areas that are less likely to be looked at by a user, there may be less of a user perceived quality degradation, for example, when combined with adjusting the rendering resolution based on eye tracking data (e.g., foveated rendering). As the initial rendering resolution of the ROIs is already higher, when foveated rendering is used, there is less of a shift in rendering resolution that could be perceived by the user as they look around. These designated ROI 410 may be made available (e.g., by an API call during runtime) to other programs (e.g., from the rendering engine 320 or GPU 314). Alternatively, or in addition, the rendering engine 320 of FIG. 3 may detect the areas which are rendered in a higher resolution than other areas and report those areas as designated ROIs 410.

In another example, the ROI determination engine 402 may analyze various aspects of the image for display to the user to determine ROIs in the image. For example, where designated ROI 410, virtual objects 406, and physical objects 408 information is not available, the ROI determination engine 402 may access one or more of the images generated for display to the user from, for example, the GPU 314 and perform object detection on the images. The ROI determination engine 402 may perform object detection using any type of object detection algorithm, including, but not limited to facial recognition, object recognition, feature recognition, tracking or pattern recognition algorithms, etc. Areas corresponding to detected objects, or certain types of detected object, such as faces, animals, etc., may be determined to be an ROI.

As another example ROI determination technique, the ROI determination engine 402 may analyze the images for converging lines. Converging lines in content may draw attention of a user to an area where the lines converge. The ROI determination engine 402 may thus determine an area of an image with such converging lines as an ROI.

As another example, an ROI determination technique applied by the ROI determination engine 402 may be based on portions of the images that are blurred or not in focus or are of a lower resolution as compared to other portions of an image (e.g., based on foveated rendering). For example, the ROI determination engine 402 may determine areas that are blurred (or are in focus) as ROI(s). In another example, the ROI determination engine 402 may determine areas in an image that are of a higher resolution (as compared to other areas of the image) as ROIs.

In some cases, the ROI determination engine 402 may determine an ROI based on information from multiple images. For example, motion vectors may be determined between multiple image frames for pixels or groups of pixels. The ROI determination engine 402 may compare the motion vectors across pixels or groups of pixels from the different image frames to determine whether particular pixels or groups of pixels move (or move greater than a threshold amount of motion) relative to the other pixels or groups of pixels. The ROI determination engine 402 may determine areas exhibiting more motion (e.g., more than the threshold amount of motion) as ROI(s).

In some cases, rendering of the images displayed to the user may be performed by a computing device separate from another computing device which displays the images to the user. In such cases, the images may be compressed, for example as a compressed video stream. In some cases, ROI information may be determined based on properties of the compressed image data (e.g., frames or pictures of a compressed video stream) by the computing device receiving and decompressing the video stream. For example, video is often compressed using a set of reference frames (or keyframes) and motion vectors (e.g., motion vectors 412). The motion vectors 412 describe how blocks of pixels move in comparison to a reference frame. The motion vectors 412 can be used to determine areas in the video stream that exhibit more motion than other areas. The ROI determination engine 402 may determine that areas exhibiting more motion (e.g., an amount of motion greater than the threshold amount of motion) are ROIs.

In some cases, ROI determination engine 402 may include or use a machine learning (ML) system or technique (e.g., a deep learning, such as one or more neural networks) to determine that an area in an image is an ROI. The ML system may use as input information from any of the above described examples, such as motion vectors, or any other type of information, and generate predictions of where one or more ROIs are for images to be displayed to the user. In some cases, multiple ML systems may be used by the ROI determination engine 402. For example, a ML system may be trained to generate ROI predictions based on motion vectors, while another ML system may be trained to generate ROI predictions based on recognized objects, etc. Multiple ML systems may also be chained in some aspects. In some cases, the ML system may take multiple types of information to generate predictions. For example, an ML system may be trained to determine an ROI based on motion vectors, focused areas (areas of an image that are in focus as compared to other areas of the image), and/or detected objects. In some cases, a combination of multiple techniques may be used to determine an ROI.

After one or more ROI are identified by the ROI determination engine 402, information associated with the identified ROIs may be transmitted to the attentiveness determination engine 404. The attentiveness determination engine 404 may compare the identified ROIs to eye tracking information 414. The eye tracking information 414 may be received from, for example, the eye tracker 303 described above with respect to FIG. 3. The attentiveness determination engine 404 determines whether the user is focused on the content being displayed.

Figure 5:
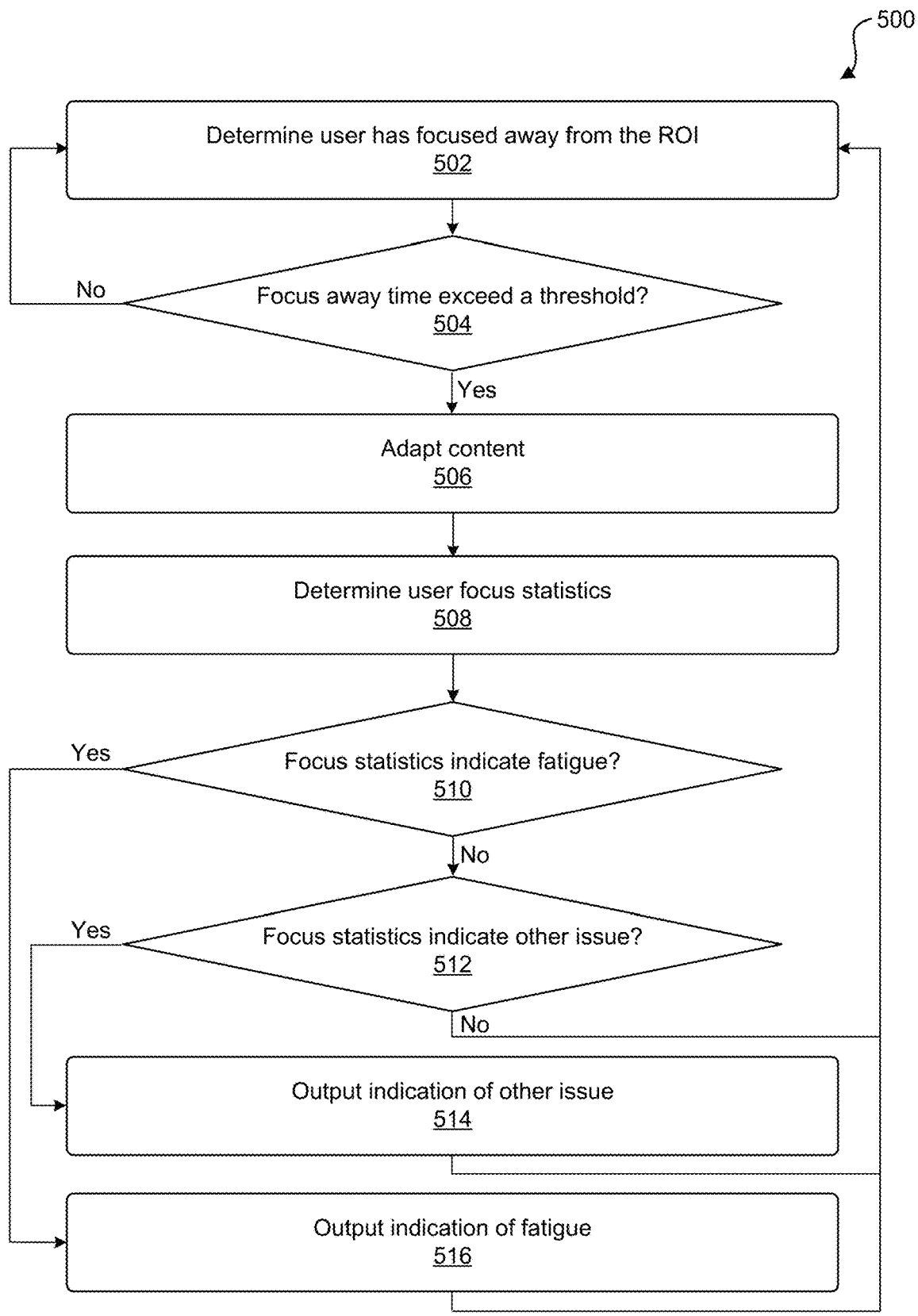
FIG. 5 is a flow diagram illustrating a technique for evaluating user focus, in accordance with aspects of the present disclosure.

FIG. 5 is a flow diagram illustrating an example of a process 500 for evaluating user focus, in accordance with aspects of the present disclosure. In some cases, the process 500 for evaluating user focus may be performed, for example, by the attentiveness determination engine 404. At block 502, a determination that a user has focused away from one or more ROIs of an image is made. The determination that a user has focused away from the one or more ROIs may be made based on a comparison of the eye tracking information and the one or more ROIs in the image displayed to the user by a system (e.g., the XR system 300). For example, a location at which a user's eye is gazing or looking provides an indication of an area of an image for which the user is focused. For images displayed by the system (e.g., the XR system 300) to the user, it is expected that an attentive user would focus on one or more ROIs identified in the images. As the eye tracking information indicates a location at which the user's eye is gazing, when the user is focused on the one or more ROIs, the eye tracking information overlaps with one or more ROIs in the images. A determination that the user focused away and thus may not be paying attention to the images displayed by the system (e.g., the XR system 300) may be made when the eye tracking information deviates from the ROIs of the image.

At block 504, an amount of time the user is focused away from the ROIs of the image may be compared to a threshold amount of time (e.g., 2 seconds, 5 seconds, 6 seconds, or other amount of time). As eyes may move from area to area in the one or more images consciously or unconsciously even when a user is paying attention, when the user is focused away from the ROIs for less than the threshold amount of time, execution may return to block 502. If the user is focused away from the ROIs for more than the threshold amount of time, in some cases, the content in additional images (e.g., images displayed after the determination that user has focused away) displayed to the user by the system (e.g., the XR system 300) may be adapted to help regain the user's focus at block 506. For example, objects in the image may be moved, perturbed, highlighted, etc., new objects may be introduced, a topic may be changed, any combination thereof, and/or other adaptations of the content. In some cases, content adaptation may be used to help generate or increase ratings for content creators. For example, different content may be presented to the user and the content may be rated based on how long the user focuses on the content before focusing away from the content.

At block 508, user focus statistics may be determined. The user focus statistics may be statistics describing the areas focused on by the user. Examples of such statistics may include an amount of time the user has focused on the ROIs as compared to other areas, how quickly the users focus moves to new ROI, whether instances where the user has focused away from the ROIs for longer than the threshold amount of time are occurring is becoming more common or less common, whether an amount of time spent focused on the ROIs is decreasing over time, an amount of time or percentage of time the eyes of the user are both focused on the same area, speed at which the user's area of focus changes, any combination thereof, and/or other information.

At block 510, the focus statistics may be analyzed for indications of user fatigue. Prolonged low interest or attentiveness levels, such as following a time period of high interest levels, may be a symptom of user fatigue. The analysis of indications of user fatigue may take into account focus statistics, such as an indication that the user has focused away from the ROIs for longer than the threshold amount of time on a more common or less common basis, whether an amount of time spent focused on the ROIs is decreasing over time, etc. For example, focus statistics (e.g., indicating that the user is spending more time focused on areas outside of the ROI, etc.) can be used as an indication that the user may not be interested in the content. Where the user has previously been focusing on the ROIs for a significant amount of time, but now is increasingly not focused on the ROIs, the system may determine that the user is or may be fatigued. In some cases, this analysis may be performed by one or more AI/ML algorithms trained to predict fatigue based on the determined user focus statistics.

If the user focus statistics indicate fatigue, execution may proceed to block 516 and an indication of possible user fatigue may be output (e.g., displayed as a notification indicating possible fatigue, provided as an audio output, provided as a haptic output, any combination thereof, and/or provided as other type(s) of output). Output of the indication of possible user fatigue may be used in a variety of ways. For example, the indication of possible user fatigue may trigger a warning to be displayed to the user indicating that they may want to take a break from viewing the content, the content may be adjusted to provide a point where a user may feel a break from viewing the content is appropriate, etc.

At block 512, the focus statistics may be analyzed for indications of other visual conditions or issues. For example, where the areas at which the eyes of the user are focused are consistently different, a determination that the user may be affected by strabismus (hypertropia) may be made. As indicated above, focus statistics indicating an amount of time or percentage of time the eyes of the user are both focused on the same area may be collected and compared against a threshold time (e.g., 2 seconds, 3 seconds, 5 seconds, etc.) or percentage of time (25%, 50%, 60%, 75%, etc.) to determine whether the user may be affected by strabismus or other condition. In some cases, this analysis may be performed by one or more AI/ML algorithms trained to predict these other visual conditions or issues based on the determined user focus statistics. In some cases, the visual statistics may also be used to provide an indication of non-visual specific issues which may be visual or eye movement based symptoms, such as attention deficit/hyperactivity disorder, other attention disorders, hypertension, etc. Of note, while the focus statistics are shown in FIG. 5 as being analyzed sequentially in blocks 510 and 512, it should be understood that the focus statistics may be analyzed for fatigue and other visual issues substantially in parallel.

If the user focus statistics indicate other visual conditions or issues may be present, execution may proceed to block 514 and an indication of the possible visual condition or issue may be output (e.g., displayed as a notification indicating possible visual condition or issue, provided as an audio output, provided as a haptic output, any combination thereof, and/or provided as other type(s) of output). A variety of responses to this indication can be performed. For example, where an indication that the user is affected by strabismus is received, a warning may be displayed to the user. As another example, evaluating user focus may be adjusted to use eye tracking information from either a single eye or consider the user as focusing on an ROI if the eye tracking data for at least one eye overlaps with the ROI.

In some cases, the eye tracker may provide additional information about a user's eye beyond where the user's eye is pointing. For example, the eye tracker may provide information about eye movements, such as an indication that the user is blinking, eye fixation information, pupil size change information, an indication that the eye is have difficulties focusing on the image, etc. This information about eye movements may also be used to predict fatigue and/or other visual issues.

Figure 6:
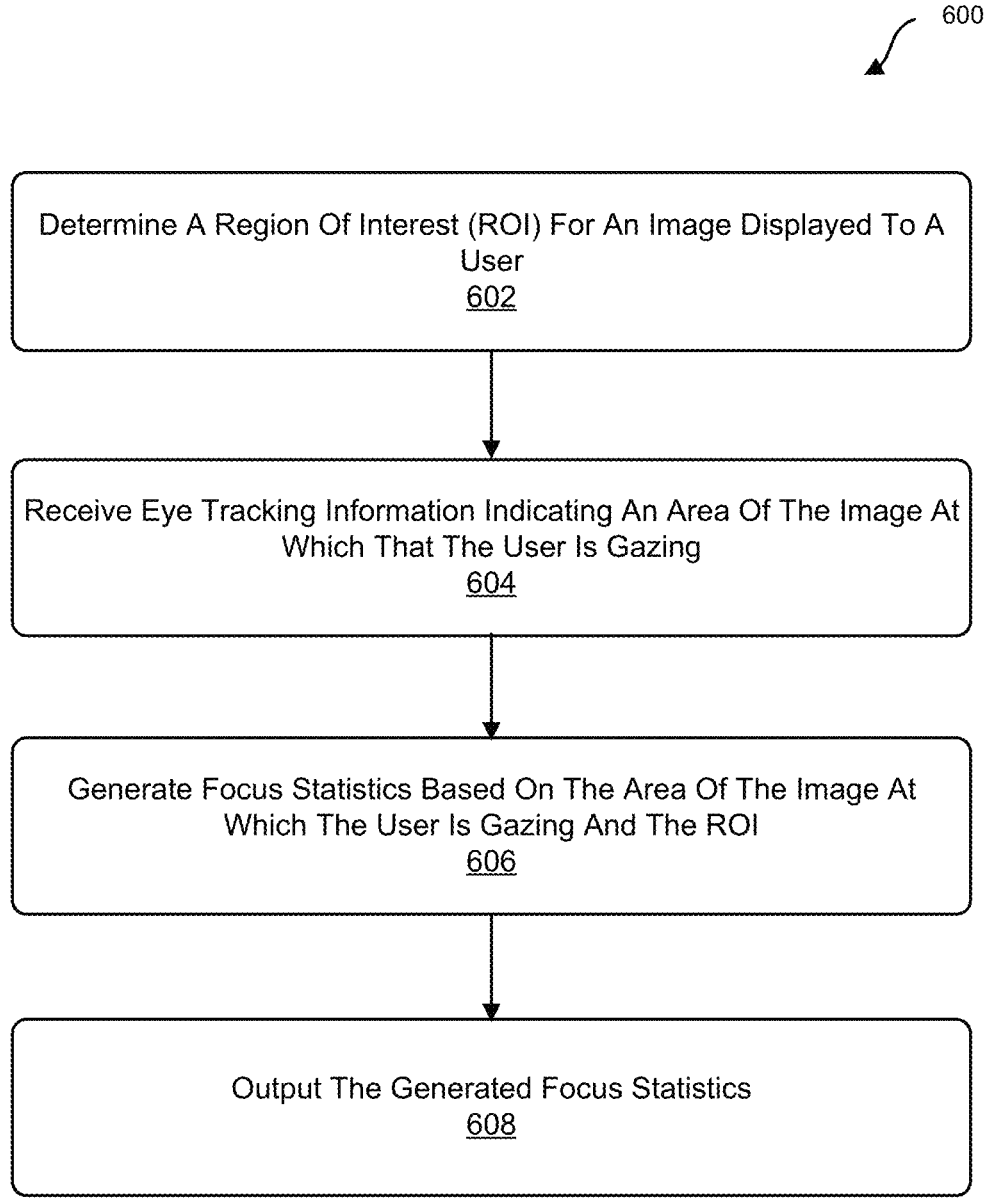
FIG. 6 is a flow diagram illustrating a technique for attention evaluation, in accordance with aspects of the present disclosure.

FIG. 6 is a flow diagram illustrating an example of a technique 600 for attention evaluation, in accordance with aspects of the present disclosure. At operation 602, the technique 600 includes determining one or more ROIs for an image displayed to a user. For example, an XR system (e.g., the XR system 300) may display images (e.g., video frames) to a user, the images including content for the user. The images include one or more ROIs. In some cases, the determination of the ROI may be based on received ROI information for the image. For example, one or more portions of the content may be designated as the one or more ROIs by a content creator and these designated ROI(s) may be determined to be ROIs. In some cases, the image to be displayed may be analyzed for ROIs. For example, object detection, face detection, and/or other type of detection may be performed on the image. As another example, virtual objects that are superimposed or merged with the physical environment (or images of the physical environment) may be determined to be one or more ROIs. In some cases, the ROI is determined based on a received indication of a location of the ROI in the image. In some cases, the ROI is determined based on an analysis of the image. In some cases, the ROI is determined based on an object detected in the image At operation 604, the technique 600 includes receiving eye tracking information. The eye tracking information indicates one or more areas of the image at which the user is gazing or looking. For example, an eye tracker may track where eyes of a user are pointing and generate eye tracking information indicating the one or more areas in the image at which eyes (or each eye individually) of the user are gazing.

At operation 606, the technique 600 includes generating focus statistics based on the area of the image at which the user is gazing and the one or more ROIs. For example, the one or more areas of the image at which the user is gazing may be compared to the determined one or more ROIs to determine the attention level. In some cases, the focus statistics may indicate a first amount of time when the area of the image at which the user is gazing overlaps with the ROI and a second amount of time when the area of the image at which the user is gazing does not overlap with the ROI. A determination that the user's attention is relatively low may occur when the user spends more time looking at areas not identified as an ROI. For example, the technique 600 may determine that the attention level is a low attention level when the second amount of time exceeds the first amount of time by a threshold amount. In some cases, the focus statistics are based on a comparison of the area of the image and the ROI and the technique 600 may include determining, based on the focus statistics, potential fatigue of the user, and outputting an indication of the potential fatigue. In some cases, outputting the indication of the potential fatigue includes displaying a fatigue warning to the user. In some cases, the focus statistics are based on a comparison of the area of the image and the ROI, the focus statistics indicate that the eyes of the user are gazing at different areas of the image, and the technique 600 may include determining, based on the focus statistics, that the user has a potential visual condition, and outputting an indication of the potential visual condition. In some cases, the focus statistics indicate a first amount of time when the area of the image at which the user is gazing overlaps with the ROI, and a second amount of time where the area of the image at which the user is gazing does not overlap with the ROI, and the technique 600 may include determining an attention level based on the first amount of time and the second amount of time. In some cases, the attention level is determined to be a low attention level when the second amount of time exceeds the first amount of time by a threshold amount.

At operation 608, the technique 600 includes outputting the determined attention level. The output may be used by one or more components of the XR system. In some examples, in response to the output attention level, content being presented to the user may be adjusted based on the output attention level. For example, the content may be adjusted to help increase the user's attention level. In some cases, focus statistics may be generated based on the comparison of the one or more areas of the image at which the user is gazing and the one or more ROIs. Examples of focus statistics may include an amount of time the user has focused on the ROIs as compared to other areas, how quickly the users focus moves to new ROI, whether instances where the user has focused away from the ROIs for longer than the threshold amount of time are occurring is becoming more common or less common, whether an amount of time spent focused on the ROIs is decreasing over time, an amount of time or percentage of time the eyes of the user are both focused on the same area, speed at which the user's area of focus changes, etc. In some cases, the technique 600 may determine potential fatigue of the user (or that the user is fatigued) based on the focus statistics. For example, where the user was previously focusing on the one or more ROIs in displayed images, but is now no longer focusing on the ROI(s), the technique 600 may determine that the user is fatigued. In some cases, the technique 600 may output an indication of the potential fatigue. The XR system may, for example, warn the user of possible fatigue based on the indication (e.g., by displaying a fatigue warning to the user). In some cases, the technique 600 may also include adjusting content in an additional image based on the generated focus statistics.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1: A method for attention evaluation. The method comprising: determining a region of interest (ROI) for an image displayed to a user; receiving eye tracking information indicating an area of the image at which the user is gazing; generating focus statistics based on the area of the image at which the user is gazing and the ROI; and outputting the generated focus statistics.

Aspect 2. The method of claim 1, wherein the focus statistics are based on a comparison of the area of the image and the ROI and the method further comprising: determining, based on the focus statistics, potential fatigue of the user; and outputting an indication of the potential fatigue.

Aspect 3. The method of claim 2, wherein outputting the indication of the potential fatigue includes displaying a fatigue warning to the user.

Aspect 4. The method of any of claims 1-3, wherein the focus statistics are based on a comparison of the area of the image and the ROI, wherein the focus statistics indicate that eyes of the user are gazing at different areas of the image, and the method further comprising: determining, based on the focus statistics, that the user has a potential visual condition; and outputting an indication of the potential visual condition.

Aspect 5. The method of any of claims 1-4, wherein the focus statistics indicate a first amount of time when the area of the image at which the user is gazing overlap with the ROI, and a second amount of time where the area of the image at which the user is gazing does not overlap with the ROI, and further comprising determining an attention level based on the first amount of time and the second amount of time.

Aspect 6. The method of claim 5, wherein the attention level is determined to be a low attention level when the second amount of time exceeds the first amount of time by a threshold amount.

Aspect 7. The method of any of claims 1-6, further comprising adjusting content in an additional image based on the generated focus statistics.

Aspect 8. The method of any of claims 1-7, wherein the ROI is determined based on a received indication of a location of the ROI in the image.

Aspect 9. The method of any of claims 1-8, wherein the ROI is determined based on an analysis of the image.

Aspect 10. The method of any of claims 1-9, wherein the ROI is determined based on an object detected in the image.

Aspect 11. An apparatus for attention evaluation, comprising: at least one memory comprising instructions; and at least one processor coupled to the at least one memory and configured to: determine a region of interest (ROI) for an image displayed to a user; receive eye tracking information indicating an area of the image at which the user is gazing; generate focus statistics based on the area of the image at which the user is gazing and the ROI; and output the generated one or more focus statistics.

Aspect 12. The apparatus of claim 11, wherein the focus statistics are based on a comparison of the area of the image and the ROI, and wherein the at least one processor is further configured to: determine, based on the focus statistics, potential fatigue of the user; and output an indication of the potential fatigue.

Aspect 13. The apparatus of claim 12, wherein the processor is further configured to output the indication of the potential fatigue by displaying a fatigue warning to the user.

Aspect 14. The apparatus of any of claims 11-13, wherein the focus statistics are based on a comparison of the area of the image and the ROI, wherein the focus statistics indicate that eyes of the user are gazing at different areas of the image, and wherein the processor is further configured to: determine, based on the focus statistics, that the user has a potential visual condition; and output an indication of the potential visual condition.

Aspect 15. The apparatus of any of claims 11-14, wherein the focus statistics indicate a first amount of time when the area of the image at which the user is gazing overlaps with the ROI overlap, and a second amount of time where the area of the image at which the user is gazing does not overlap with the ROI, and wherein the processor is further configured to determine an attention level based on the first amount of time and the second amount of time.

Aspect 16. The apparatus of claim 15, wherein the at least one processor is configured to determine the attention level is determined to be a low attention level when the second amount of time exceeds the first amount of time by a threshold amount.

Aspect 17. The apparatus of any of claims 1-16, wherein the processor is further configured to adjust content in an additional image based on the generated focus statistics.

Aspect 18. The apparatus of any of claims 11-17, wherein the at least one processor is configured to determine the ROI is determined based on a received indication of a location of the ROI in the image.

Aspect 19. The apparatus of any of claims 11-18, wherein the at least one processor is configured to determine the ROI is determined based on an analysis of the image.

Aspect 20. The apparatus of any of claims 11-19, wherein the at least one processor is configured to determine the ROI is determined based on an object detected in the image.

Aspect 21. A non-transitory computer-readable medium having stored thereon instructions that, when executed by at least one processor, cause the at least one processor to: determine a region of interest (ROI) for an image displayed to a user; receive eye tracking information indicating an area of the image at which the user is gazing; generate focus statistics based on the area of the image at which the user is gazing and the ROI; and output the generated one or more focus statistics.

Aspect 22. The non-transitory computer-readable medium of claim 21, wherein the focus statistics are based on a comparison of the area of the image and the ROI, and wherein the instructions further cause the at least one processor to: determine, based on the focus statistics, potential fatigue of the user; and output an indication of the potential fatigue.

Aspect 23. The non-transitory computer-readable medium of claim 22, wherein the instructions further cause the at least one processor to output the indication of the potential fatigue by displaying a fatigue warning to the user.

Aspect 24. The non-transitory computer-readable medium of any of claims 21-23, wherein the focus statistics are based on a comparison of the area of the image and the ROI, wherein the focus statistics indicate that eyes of the user are gazing at different areas of the image, and wherein the instructions further cause the at least one processor to: determine, based on the focus statistics, that the user has a potential visual condition; and output an indication of the potential visual condition.

Aspect 25. The non-transitory computer-readable medium of any of claims 21-24, wherein the focus statistics indicate a first amount of time when the area of the image at which the user is gazing overlaps with the ROI, and a second amount of time where the area of the image at which the user is gazing does not overlap with the ROI, and wherein the instructions further cause the at least one processor to determine an attention level based on the first amount of time and the second amount of time.

Aspect 26. The non-transitory computer-readable medium of claim 25, wherein the attention level is determined to be a low attention level when the second amount of time exceeds the first amount of time by a threshold amount.

Aspect 27. The non-transitory computer-readable medium of any of claims 21-26, wherein the instructions further cause the at least one processor to adjust content in an additional image based on the generated focus statistics.

Aspect 28. The non-transitory computer-readable medium of any of claims 21-27, wherein the ROI is determined based on a received indication of a location of the ROI in the image.

Aspect 29. The non-transitory computer-readable medium of any of claims 21-28, wherein the ROI is determined based on an analysis of the image.

Aspect 30. The non-transitory computer-readable medium of any of claims 21-29, wherein the ROI is determined based on an object detected in the image.

Aspect 31: The apparatus of any of Aspects 11 to 20, further comprising a display configured to display one or more images.

Aspect 32: The apparatus of any of Aspects 11 to 20, further comprising a camera configured to capture eye tracking information.

Aspect 33: The apparatus of any of Aspects 11 to 20, wherein the apparatus is a mobile device.

Aspect 34: An apparatus for attention evaluation, comprising means for performing one or more of operations according to any of Aspects 11 to 20.

What is claimed is:

1. A method for attention evaluation, comprising:
   determining a region of interest (ROI) for an image displayed to a user;
   receiving, via an image sensor, eye tracking information indicating an area of the image at which the user is gazing;
   generating, via a processor, focus statistics based on the area of the image at which the user is gazing and the ROI, wherein the focus statistics indicate a first amount of time when the area of the image at which the user is gazing overlaps with the ROI, and a second amount of time when the area of the image at which the user is gazing does not overlap with the ROI;
   determining an attention level based on the first amount of time and the second amount of time; and
   outputting the attention level.

2. The method of claim 1, wherein the focus statistics are based on a comparison of the area of the image and the ROI, the method further comprising:
   determining, based on the focus statistics, potential fatigue of the user; and
   outputting an indication of the potential fatigue.

3. The method of claim 2, wherein outputting the indication of the potential fatigue includes displaying a fatigue warning to the user.

4. The method of claim 1, wherein the focus statistics are based on a comparison of the area of the image and the ROI, wherein the focus statistics indicate that eyes of the user are gazing at different areas of the image, the method further comprising:
   determining, based on the focus statistics, that the user has a potential visual condition; and
   outputting an indication of the potential visual condition.

5. The method of claim 1, wherein the attention level is determined to be a low attention level when the second amount of time exceeds the first amount of time by a threshold amount.

6. The method of claim 1, further comprising adjusting content in an additional image based on the generated focus statistics.

7. The method of claim 1, wherein the ROI is determined based on a received indication of a location of the ROI in the image.

8. The method of claim 1, wherein the ROI is determined based on an analysis of the image.

9. The method of claim 1, wherein the ROI is determined based on an object detected in the image.

10. An apparatus for attention evaluation, comprising:
    at least one memory comprising instructions; and
    at least one processor coupled to the at least one memory and configured to:
      determine a region of interest (ROI) for an image displayed to a user;
      receive eye tracking information indicating an area of the image at which the user is gazing;
      generate focus statistics based on the area of the image at which the user is gazing and the ROI, wherein the focus statistics indicate a first amount of time when the area of the image at which the user is gazing overlaps with the ROI, and a second amount of time when the area of the image at which the user is gazing does not overlap with the ROI;
      determine an attention level based on the first amount of time and the second amount of time; and
      output the attention level.

11. The apparatus of claim 10, wherein the focus statistics are based on a comparison of the area of the image and the ROI, and wherein the at least one processor is further configured to:
    determine, based on the focus statistics, potential fatigue of the user; and
    output an indication of the potential fatigue.

12. The apparatus of claim 11, wherein the at least one processor is further configured to output the indication of the potential fatigue by displaying a fatigue warning to the user.

13. The apparatus of claim 10, wherein the focus statistics are based on a comparison of the area of the image and the ROI, wherein the focus statistics indicate that eyes of the user are gazing at different areas of the image, and wherein the at least one processor is further configured to:
    determine, based on the focus statistics, that the user has a potential visual condition; and
    output an indication of the potential visual condition.

14. The apparatus of claim 10, wherein the at least one processor is configured to determine the attention level to be a low attention level when the second amount of time exceeds the first amount of time by a threshold amount.

15. The apparatus of claim 10, wherein the at least one processor is further configured to adjust content in an additional image based on the generated focus statistics.

16. The apparatus of claim 10, wherein the at least one processor is configured to determine the ROI based on a received indication of a location of the ROI in the image.

17. The apparatus of claim 10, wherein the at least one processor is configured to determine the ROI based on an analysis of the image.

18. The apparatus of claim 10, wherein the at least one processor is configured to determine the ROI based on an object detected in the image.

19. A non-transitory computer-readable medium having stored thereon instructions that, when executed by at least one processor, cause the at least one processor to:
- determine a region of interest (ROI) for an image displayed to a user;
- receive eye tracking information indicating an area of the image at which the user is gazing;
- generate focus statistics based on the area of the image at which the user is gazing and the ROI, wherein the focus statistics indicate a first amount of time when the area of the image at which the user is gazing overlaps with the ROI, and a second amount of time when the area of the image at which the user is gazing does not overlap with the ROI;
- determine an attention level based on the first amount of time and the second amount of time; and
- output the attention level.

20. The non-transitory computer-readable medium of claim 19, wherein the focus statistics are based on a comparison of the area of the image and the ROI, and wherein the instructions further cause the at least one processor to:
- determine, based on the focus statistics, potential fatigue of the user; and
- output an indication of the potential fatigue.

21. The non-transitory computer-readable medium of claim 20, wherein the instructions further cause the at least one processor to output the indication of the potential fatigue by displaying a fatigue warning to the user.

22. The non-transitory computer-readable medium of claim 19, wherein the focus statistics are based on a comparison of the area of the image and the ROI, wherein the focus statistics indicate that eyes of the user are gazing at different areas of the image, and wherein the instructions further cause the at least one processor to:
- determine, based on the focus statistics, that the user has a potential visual condition; and
- output an indication of the potential visual condition.

23. The non-transitory computer-readable medium of claim 19, wherein the instructions further cause the at least one processor to determine the attention level to be a low attention level when the second amount of time exceeds the first amount of time by a threshold amount.

24. The non-transitory computer-readable medium of claim 19, wherein the instructions further cause the at least one processor to adjust content in an additional image based on the generated focus statistics.

25. The non-transitory computer-readable medium of claim 19, wherein the instructions further cause the at least one processor to determine the ROI based on a received indication of a location of the ROI in the image.

26. The non-transitory computer-readable medium of claim 19, wherein the instructions further cause the at least one processor to determine the ROI based on an analysis of the image.

27. The non-transitory computer-readable medium of claim 19, wherein the instructions further cause the at least one processor to determine the ROI based on an object detected in the image.

* * * * *